United States Patent
Zhang

(10) Patent No.: US 12,203,398 B2
(45) Date of Patent: Jan. 21, 2025

(54) METHOD AND DEVICE FOR DETERMINING THE SULPHUR CONTENT IN AN EXHAUST GAS CHANNEL OF A MOTOR VEHICLE IN RELATION TO THE SUPPLIED FUEL

(71) Applicant: Vitesco Technologies GmbH, Regensburg (DE)

(72) Inventor: Hong Zhang, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 197 days.

(21) Appl. No.: 17/907,863

(22) PCT Filed: Feb. 11, 2021

(86) PCT No.: PCT/EP2021/053377
§ 371 (c)(1),
(2) Date: Aug. 29, 2022

(87) PCT Pub. No.: WO2021/175561
PCT Pub. Date: Sep. 10, 2021

(65) Prior Publication Data
US 2023/0140536 A1    May 4, 2023

(30) Foreign Application Priority Data
Mar. 4, 2020 (DE) ............... 10 2020 202 787.0

(51) Int. Cl.
*F01N 11/00* (2006.01)
*F01N 3/023* (2006.01)
*F01N 3/08* (2006.01)
*G01M 15/10* (2006.01)

(52) U.S. Cl.
CPC ............. *F01N 11/00* (2013.01); *G01M 15/102* (2013.01); *F01N 3/023* (2013.01); *F01N 3/0885* (2013.01);
(Continued)

(58) Field of Classification Search
CPC ...... F01N 11/00; F01N 3/023; F01N 2550/04; F01N 3/2066; F01N 2250/02;
(Continued)

(56) References Cited

U.S. PATENT DOCUMENTS

| 6,145,303 A | 11/2000 | Strehlau et al. ............ 60/274 |
| 6,626,033 B1 | 9/2003 | Schnaibel et al. ......... 73/114.75 |

(Continued)

FOREIGN PATENT DOCUMENTS

| CN | 1234473 A | 11/1999 | ............ B01D 53/86 |
| CN | 1341191 A | 3/2002 | ............ B01D 53/86 |

(Continued)

OTHER PUBLICATIONS

Chinese Office Action, Application No. 202180018593.2, 8 pages.
(Continued)

*Primary Examiner* — Brandon D Lee
(74) *Attorney, Agent, or Firm* — Slayden Grubert Beard PLLC

(57) ABSTRACT

Various embodiments of the teachings herein include methods for determining the sulfur content in an exhaust tract of a motor vehicle. The method may include: determining a change in the nitrogen oxide abatement efficiency of a coated particulate filter arranged in the exhaust tract and/or a determined ammonia storage capacity change of a coated particulate filter arranged in the exhaust tract; comparing the determined change to a threshold value; identifying an excessive sulfur content if the comparison shows that the determined change exceeds the threshold value; and undertaking one or more corrective actions in response to identifying an excessive sulfur content.

12 Claims, 2 Drawing Sheets

(52) U.S. Cl.
CPC .... *F01N 2550/04* (2013.01); *F01N 2560/021* (2013.01); *F01N 2560/026* (2013.01); *F01N 2570/04* (2013.01); *F01N 2900/04* (2013.01); *F01N 2900/1612* (2013.01); *F01N 2900/1622* (2013.01)

(58) Field of Classification Search
CPC ........... F01N 2550/02; F01N 2560/021; F01N 2560/026; F01N 2560/14; F01N 2570/04; F01N 2610/02; F01N 2900/0416; F01N 2900/0601; F01N 2900/1621; F01N 2900/1622; F01N 3/035; F01N 9/00; F01N 2900/04; F01N 2900/1612; F01N 3/0885; G01M 15/102; F02D 41/028; F02D 41/146; F02D 41/1441; F02D 2041/1468; Y02A 50/20; Y02T 10/12; Y02T 10/40

See application file for complete search history.

(56) References Cited

U.S. PATENT DOCUMENTS

| | | | |
|---|---|---|---|
| 2006/0258014 A1 | 11/2006 | Ceccarini | 436/119 |
| 2014/0331644 A1* | 11/2014 | Kumar | F01N 3/103 60/297 |
| 2015/0354424 A1 | 12/2015 | Kumar | F01N 3/20 |
| 2018/0071681 A1* | 3/2018 | Miller | F01N 3/023 |
| 2018/0252133 A1* | 9/2018 | Ogushi | B01D 53/9431 |
| 2019/0360377 A1 | 11/2019 | Joo | F01N 3/208 |
| 2020/0191073 A1 | 6/2020 | Charbonnel | F02D 41/0052 |
| 2020/0318513 A1 | 10/2020 | Zhang | F01N 3/0824 |

FOREIGN PATENT DOCUMENTS

| | | | | |
|---|---|---|---|---|
| DE | 60 222 226 | 5/2008 | | G01N 33/28 |
| DE | 11 2014 000 573 | 11/2015 | | F01N 3/20 |
| DE | 10 2016 209 358 | 11/2017 | | F01N 11/00 |
| DE | 10 2017 120 712 | 3/2018 | | F01N 9/00 |
| DE | 10 2018 127 915 | 11/2019 | | F01N 9/00 |
| DE | 10 2019 134 821 | 6/2020 | | F02D 41/00 |
| WO | 2020 210068 | 10/2020 | | F01N 3/08 |

OTHER PUBLICATIONS

Search Report for International Application No. PCT/EP2021/053377, 12 pages, Apr. 13, 2021.

Search Report for German Application No. 10 2020 202 787.0, 7 pages, Oct. 29, 2020.

* cited by examiner

METHOD AND DEVICE FOR DETERMINING THE SULPHUR CONTENT IN AN EXHAUST GAS CHANNEL OF A MOTOR VEHICLE IN RELATION TO THE SUPPLIED FUEL

CROSS-REFERENCE TO RELATED APPLICATIONS

This application is a U.S. National Stage Application of International Application No. PCT/EP2021/053377 filed Feb. 11, 2021, which designates the United States of America, and claims priority to DE Application No. 10 2020 202 787.0 filed Mar. 4, 2020, the contents of which are hereby incorporated by reference in their entirety.

TECHNICAL FIELD

The present disclosure relates to motor vehicles. Various embodiments include methods and/or apparatuses for determining the sulfur content in the exhaust tract of a motor vehicle.

BACKGROUND

Some systems use a sulfur sensor arranged in the exhaust tract of a motor vehicle to be able to detect an excessively high sulfur content in the exhaust tract of the motor vehicle and warn the driver of the motor vehicle of misfueling. However, the production of such a sulfur sensor is associated with high development costs and therefore such sensors that are also suitable for mass production are not yet available on the market.

A method for determining the fuel sulfur content of an internal combustion engine is described in DE 602 22 226 T2. In this method, an estimation of the sulfur content in a NOx storage catalytic converter, where a reduction in the stored NOx amount is used as a measure of the sulfur content, is carried out.

Some systems include a coated particulate filter in the exhaust tract of a motor vehicle to reduce pollutants in the exhaust gas emitted to the environment of the motor vehicle. Such a coated particulate filter may be a coated diesel particulate filter, also known by the abbreviation SDPF. Such a diesel particulate filter combines the functionalities of an SCR catalytic converter and a diesel particulate filter. It reduces both the nitrogen oxide emissions NOx and the soot emissions of the vehicle.

According to regulatory requirements, particulate filter systems must be monitored precisely enough that defects causing predetermined threshold values to be exceeded are detected early enough for suitable countermeasures to be taken. Fault detection in a particulate filter system requires the most accurate possible measurement of the filter loading with soot.

SUMMARY

The teachings of the present disclosure include methods for determining the sulfur content in an exhaust tract of a motor vehicle, by means of which a more precise determination of the sulfur content is achieved. For example, some embodiments include a method for determining the sulfur content in an exhaust tract of a motor vehicle, characterized in that to determine the sulfur content a determined change in the nitrogen oxide abatement efficiency of a coated particulate filter arranged in the exhaust tract and/or a determined ammonia storage capacity change of a coated particulate filter arranged in the exhaust tract is determined, the determined change is compared with a threshold value and the presence of an excessive sulfur content is detected if the comparison shows that the determined change exceeds the threshold value.

In some embodiments, the threshold value is a predetermined constant value.

In some embodiments, to determine the sulfur content a determination of a first value for the nitrogen oxide abatement efficiency of the particulate filter is undertaken at a first juncture, determination of a second value for the nitrogen oxide abatement efficiency of the particulate filter is undertaken at a second juncture, the fuel consumption between the two junctures is determined, difference between the two values for the nitrogen abatement efficiency is determined, a quotient of the determined difference to the determined fuel consumption is determined, the determined quotient is compared with the threshold value and the presence of an excessive sulfur content is detected if the determined difference exceeds the threshold value.

In some embodiments, the first juncture is before a first fueling operation of the motor vehicle and the second juncture is after the first fueling operation.

In some embodiments, the first juncture is after a first fueling operation of the motor vehicle and the second juncture is after the first juncture and before a second fueling operation.

In some embodiments, to determine the sulfur content a determination of a first value for the ammonia storage capacity of the particulate filter is undertaken at a first juncture, a determination of a second value for the ammonia storage capacity of the particulate filter is undertaken at a second juncture, the fuel consumption between the two junctures is determined, a difference between the two values for the ammonia storage capacity of the particulate filter is determined, a quotient of the determined difference to the determined fuel consumption is determined, the determined quotient is compared with the threshold value and the presence of an excessive sulfur content is detected if the determined difference exceeds the threshold value.

In some embodiments, the first juncture is before a first fueling operation of the motor vehicle and the second juncture is after the first fueling operation.

In some embodiments, the first juncture is after a first fueling operation of the motor vehicle and the second juncture is after the first juncture and before a second fueling operation.

In some embodiments, it is controlled by a control unit.

In some embodiments, the control unit determines the sulfur content on the basis of a stored operating program and stored data and using sensor signals sent to it and outputs a signal indicating the elevated sulfur content if it detects the presence of an excessive sulfur content.

In some embodiments, after detection of the presence of an excessive sulfur content a particle filter regeneration is performed and after the particle filter regeneration has been performed a new determination of the sulfur content is performed to check the plausibility of the presence of an excessive sulfur content.

As another example, some embodiments include an apparatus for determining the sulfur content in an exhaust tract of a motor vehicle which comprises a control unit (5) which is configured for controlling one or more methods as described herein.

BRIEF DESCRIPTION OF THE DRAWINGS

Further properties of the various embodiments are apparent from the following exemplary elucidation thereof with reference to the FIGURES.

DETAILED DESCRIPTION

Figure 1:
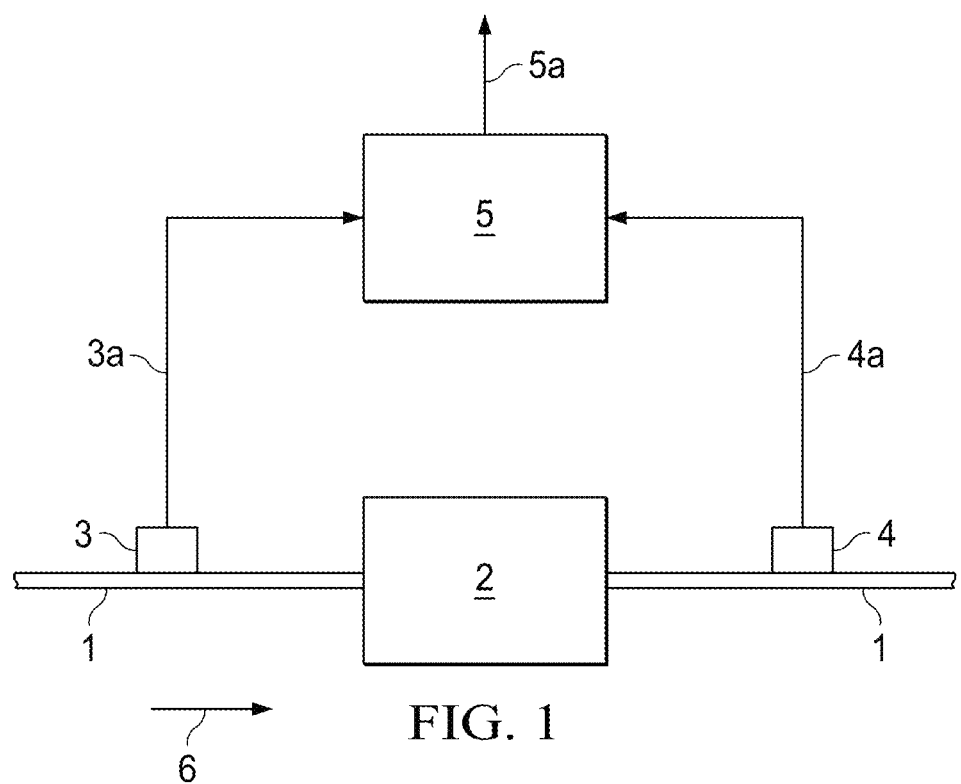
FIG. 1 shows an embodiment of an apparatus for determining the sulfur content in an exhaust tract of a motor vehicle incorporating teachings of the present disclosure.

Teachings of the present disclosure include methods and/or systems for determining the sulfur content in an exhaust tract of a motor vehicle, to determine the sulfur content a determined change in the nitrogen oxide abatement efficiency of a coated particulate filter arranged in the exhaust tract and/or a determined ammonia storage capacity change of a coated particulate filter arranged in the exhaust tract is determined, the determined change is compared with a threshold value and the presence of an excessive sulfur content is detected if the determined change exceeds the threshold value. The processes described herein are simple to realize with conventional means and allow reliable determination of the sulfur content in an exhaust tract of an exhaust tract comprising a coated particulate filter.

In some embodiments, to determine the sulfur content a determination of a first value for the nitrogen oxide abatement efficiency of the particulate filter is undertaken at a first juncture, a determination of a second value for the nitrogen oxide abatement efficiency of the particulate filter is undertaken at a second juncture, the fuel consumption between the two junctures is determined, a difference between the two values for the nitrogen oxide abatement efficiency is determined, a quotient of the determined difference to the determined fuel consumption is determined, the determined quotient is compared to the threshold value and the presence of an excessive sulfur content is detected if the determined difference exceeds the threshold value. In some embodiments, the detection of the sulfur content is carried out by evaluation of the change in the nitrogen oxide abatement efficiency based on the fuel consumption between two non-contemporaneous determinations of the nitrogen oxide abatement efficiency. For example the first determination of the nitrogen oxide abatement efficiency may be carried out before a fueling operation and the second determination of the nitrogen oxide abatement efficiency may be carried out after this fueling operation. In some embodiments, the first determination of the nitrogen oxide abatement efficiency may be carried out shortly after a first fueling operation and the second determination of the nitrogen oxide abatement efficiency may be carried out after the first determination but before a subsequent fueling operation. Here too, the fuel consumption between the two determinations must be taken into account in each case.

In some embodiments, to determine the sulfur content a determination of the ammonia storage capacity change is performed in addition to a determination of the nitrogen oxide abatement efficiency and the presence of an excessive sulfur content is detected if at least one of these values exceeds a predetermined threshold value.

In some embodiments, to determine the sulfur content a determination of a first value for the ammonia storage capacity of the particulate filter is undertaken at a first juncture, a determination of a second value for the ammonia storage capacity of the particulate filter is undertaken at a second juncture, the fuel consumption between the two junctures is determined, a difference between the two values for the ammonia storage capacity of the particulate filter is determined, a quotient of the determined difference to the determined fuel consumption is determined, the determined quotient is compared to the threshold value and the presence of an excessive sulfur content is detected if the determined difference exceeds the threshold value. In some embodiments, the detection of the sulfur content is carried out by evaluation of the change in the ammonia storage capacity of the particulate filter based on the fuel consumption between two non-contemporaneous determinations of the ammonia storage capacity particulate filter. For example the first determination of the ammonia storage capacity may be carried out before a fueling operation and the second determination of the ammonia storage capacity may be carried out after this fueling operation. In some embodiments, the first determination of the ammonia storage capacity may be carried out shortly after a first fueling operation and the second determination of the ammonia storage capacity may be carried out after the first determination but before a subsequent fueling operation. Here too, the fuel consumption between the two determinations must be taken into account in each case.

In some embodiments, diagnostic certainty is increased by initiating a particulate filter regeneration after detecting an excessive sulfur content. The above-described determination of the sulfur content is performed again as soon as possible after this particle filter regeneration. If this new determination of the sulfur content in turn has the result that an elevated sulfur content is present then this result is a confirmation/plausibility check of the preceding result.

Further properties of the various embodiments of the teachings herein are apparent from the following elucidation thereof with reference to the FIGURES. FIG. 1 shows an exemplary embodiment of an apparatus for determining the sulfur content in an exhaust tract of a motor vehicle. In the exemplary embodiment shown, a coated diesel particulate filter 2 is arranged in the exhaust tract 1 of a motor vehicle. This coated diesel particulate filter is provided for filtering out pollutant particles from the exhaust gas emitted by the engine of the motor vehicle which flows through the coated diesel particulate filter 2 in the exhaust gas flow direction 6, so that the exhaust gas emitted by the particulate filter 2 has a reduced pollutant content.

In some embodiments, the sulfur content in the exhaust tract is determined by determining and evaluating a determined change in the nitrogen oxide abatement efficiency of the particulate filter 2 arranged in the exhaust tract 1. The determination of the change in the nitrogen oxide abatement efficiency is carried out using the output signals 3a of a first nitrogen oxide sensor 3 arranged upstream of the particulate filter 2 in the exhaust tract 1 and the output signals 4a of a second nitrogen oxide sensor 4 arranged downstream of the particulate filter 2 in the exhaust tract 1. These output signals of the nitrogen oxide sensors are sent to a control unit 5 Said unit evaluates the output signals of the nitrogen oxide sensors based on a stored operating program and stored data and after detecting the presence of an excessive sulfur content provides an output signal 5a which signals the excessive sulfur content.

Determination of a nitrogen oxide abatement value may be carried out by subtraction of the nitrogen oxide value provided by the nitrogen oxide sensor 4 from the nitrogen oxide value provided by the nitrogen oxide sensor 3.

The sulfur content may be determined by undertaking a determination of a first value for the nitrogen abatement efficiency of the particulate filter at a first juncture. A determination of a second value for the nitrogen abatement efficiency of the particulate filter is then undertaken at a second juncture. The fuel consumption between the two points junctures is also determined. The difference between the two values for the nitrogen abatement efficiency is then determined. A quotient of the determined difference to the determined fuel consumption is then determined. This quotient is compared to a threshold value. If the determined difference exceeds the predetermined threshold value the presence of an excessive sulfur content is detected and the control unit 5 outputs a signal 5a indicating this increased sulfur content.

The threshold value mentioned is an empirically determined constant threshold value. An excessive sulfur content may be detected for example if the determined efficiency change exceeds a threshold set for example at a reduction in efficiency of 10% per 100 L of fuel consumption. This means that the presence of an excessive sulfur content is detected if between the two abovementioned junctures the nitrogen oxide abatement efficiency decreases by more than 10% based on a fuel consumption of 100 L.

The recited first juncture at which the first value for the nitrogen oxide abatement efficiency is determined is preferably before a fueling operation and the recited second juncture is preferably after this fueling operation.

In some embodiments, the first juncture at which the first value for the nitrogen oxide abatement efficiency is determined may be after a first fueling operation and the second juncture may be after this first juncture but before a subsequent second fueling operation.

In some embodiments, a coated diesel particulate filter 2 is arranged in the exhaust tract 1 of a motor vehicle. This coated diesel particulate filter is provided for filtering out pollutant particles from the exhaust gas emitted by the engine of the motor vehicle which flows through the coated diesel particulate filter 2 in the exhaust gas flow direction 6, so that the exhaust gas emitted by the particulate filter 2 has a reduced pollutant content.

In some embodiments, the sulfur content in the exhaust tract is determined by determining and evaluating a change in the ammonia storage capacity of the particulate filter arranged in the exhaust tract 1. The determination of the change in the ammonia storage capacity of the particulate filter is carried out using the output signals 3a of a first ammonia 3 arranged upstream of the particulate filter 2 in the exhaust tract 1 and the output signals 4a of a second ammonia sensor 4 arranged downstream of the particulate filter 2 in the exhaust tract 1. These output signals of the ammonia sensors are sent to a control unit 5. Said unit evaluates the output signals of the ammonia sensors based on a stored operating program and stored data and after detecting the presence of an excessive sulfur content provides an output signal 5a which signals the excessive sulfur content.

Determination of a change in the ammonia storage capacity may be carried out by subtraction of the ammonia value provided by the ammonia sensor 4 from the ammonia value provided by the ammonia sensor 3

The sulfur content may be determined by undertaking a determination of a first value for the ammonia storage capacity of the particulate filter at a first juncture. A determination of a second value for the ammonia storage capacity of the particulate filter is then undertaken at a second juncture. The fuel consumption between the two points junctures is also determined. The difference between the two values for the ammonia storage capacity is then determined. A quotient of the determined difference to the determined fuel consumption is then determined. This quotient is compared to a threshold value. If the determined difference exceeds the predetermined threshold value the presence of an excessive sulfur content is detected and the control unit 5 outputs a signal 5a indicating this increased sulfur content.

The threshold value mentioned is an empirically determined constant threshold value. An excessive sulfur content is detected for example if the determined change in the ammonia storage capacity of the particulate filter exceeds a threshold set for example at a reduction of the ammonia storage capacity of 0.4 g per 100 L of fuel consumption. This means that the presence of an excessive sulfur content is detected if between the two abovementioned junctures the ammonia storage capacity of the particulate filter decreases by more than 0.4 g based on a fuel consumption of 100 L.

The recited first juncture at which the first value for the ammonia storage capacity is determined is preferably before a fueling operation and the recited second juncture may be after this fueling operation.

In some embodiments, the first juncture at which the first value for the ammonia storage capacity is determined may be after a first fueling operation and the second juncture may be after this first juncture but before a subsequent second fueling operation.

In some embodiments, both a nitrogen oxide sensor 3 and an ammonia sensor are arranged upstream of the particulate filter 2 and both a nitrogen oxide sensor 4 and a further ammonia sensor are arranged downstream of the particulate filter 2 in the exhaust tract 1. In this further embodiment, to determine the sulfur content both a determination of the nitrogen oxide abatement efficiency and a determination of the ammonia storage capacity change of the particulate filter are undertaken and evaluated. In this further embodiment the presence of an excessive sulfur content is detected if at least one of these values exceeds a predetermined threshold value.

In some embodiments, diagnostic certainty is increased by initiating a particulate filter regeneration after detecting an excessive sulfur content. For this particulate filter regeneration the temperature of exhaust gas passing through the particulate filter is brought to a high temperature of for example 600° C. to burn off pollutant particles deposited on the internal walls of the particulate filter. The above-described determination of the sulfur content is performed again as soon as possible after this particle filter regeneration. If this new determination of the sulfur content in turn has the result that an elevated sulfur content is present then this result is a confirmation/plausibility check of the preceding result.

Figure 2:
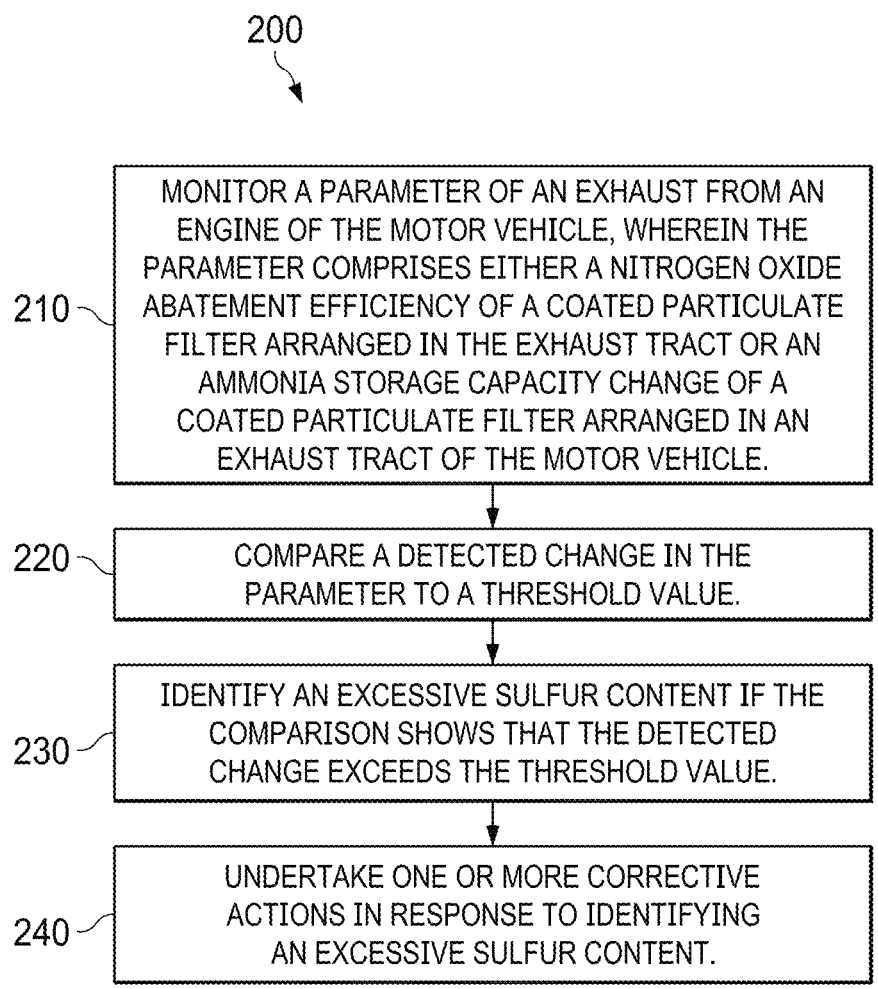
FIG. 2 shows an example method 200 incorporating teachings of the present disclosure.

FIG. 2 shows an example method 200 incorporating teachings of the present disclosure. As shown, the method 200 may include monitoring a parameter of an exhaust from an engine of the motor vehicle, wherein the parameter comprises either a nitrogen oxide abatement efficiency of a coated particulate filter arranged in the exhaust tract or an ammonia storage capacity change of a coated particulate filter arranged in an exhaust tract of the motor vehicle at step 210. The method may further include comparing a detected change in the parameter to a threshold value at step 220. The method 200 may include identifying an excessive sulfur content if the comparison shows that the detected change exceeds the threshold value at step 230. The method 200 may include undertaking one or more corrective actions in response to identifying an excessive sulfur content at step 240.

What is claimed is:

1. A method for operating a motor vehicle, the method comprising:
   monitoring a parameter of an exhaust from an engine of the motor vehicle, wherein the parameter comprises either a nitrogen oxide abatement efficiency of a coated particulate filter arranged in the exhaust tract or an ammonia storage capacity change of a coated particulate filter arranged in an exhaust tract of the motor vehicle;
   comparing a detected change in the parameter to a threshold value;
   identifying an excessive sulfur content if the comparison shows that the detected change exceeds the threshold value; and
   undertaking one or more corrective actions in response to identifying an excessive sulfur content.

2. The method as claimed in claim 1, where the threshold value is a predetermined constant value.

3. The method as claimed in claim 1, wherein determining the sulfur content including:
   determining a first value for the nitrogen oxide abatement efficiency of the particulate filter at a first point in time;
   determining a second value for the nitrogen oxide abatement efficiency of the particulate filter at a second point in time;
   calculating a fuel consumption between the two points in time;
   calculating a difference between the two values for the nitrogen abatement efficiency;
   calculating a quotient of the determined difference to the determined fuel consumption; and
   comparing the determined quotient to the threshold value.

4. The method as claimed in claim 3, wherein:
   the first point in time is before a first fueling operation of the motor vehicle; and
   the second point in time is after the first fueling operation.

5. The method as claimed in claim 3, wherein:
   the first point in time is after a first fueling operation of the motor vehicle; and
   the second point in time is after the first juncture and before a second fueling operation.

6. The method as claimed in claim 1, further comprising determining a sulfur content including:
   determining a first value for the ammonia storage capacity of the particulate filter at a third point in time;
   determining a second value for the ammonia storage capacity of the particulate filter at a fourth point in time;
   determining a fuel consumption between the third point in time and the fourth point in time;
   determining a difference between the two values for the ammonia storage capacity of the particulate filter;
   determining a quotient of the determined difference to the determined fuel consumption; comparing the determined quotient to the threshold value; and
   identifying an excessive sulfur content if the determined difference exceeds the threshold value.

7. The method as claimed in claim 6, wherein:
   the third point in time is before a first fueling operation of the motor vehicle; and
   the fourth point in time is after the first fueling operation.

8. The method as claimed in claim 6, wherein:
   the third point in time is after a first fueling operation of the motor vehicle; and
   the fourth point in time is after the third point in time and before a second fueling operation.

9. The method as claimed in claim 1, wherein a control unit performs the elements thereof.

10. The method as claimed in claim 9, wherein the control unit determines the sulfur content on the basis of a stored operating program and stored data and using sensor signals sent to it and outputs a signal indicating the elevated sulfur content if it detects the presence of an excessive sulfur content.

11. The method as claimed in claim 1, further comprising:
    after detection of the presence of an excessive sulfur content, performing a particle filter regeneration; and
    after regeneration has been performed, performing a new determination of the sulfur content to check the plausibility of the presence of an excessive sulfur content.

12. A control unit for a motor vehicle, the control unit programmed to:
    monitor a parameter of an exhaust from an engine of the motor vehicle, wherein the parameter comprises either a nitrogen oxide abatement efficiency and/or an ammonia storage capacity change of a coated particulate filter arranged in the exhaust tract;
    compare a detected change in the parameter to a threshold value;
    identify an excessive sulfur content if the comparison shows that the detected change exceeds the threshold value; and
    undertake one or more corrective actions in response to identifying an excessive sulfur content.

* * * * *